W. H. GEDDES.
LIGHT PROTECTOR.
APPLICATION FILED MAR. 1, 1906.
931,407.
Patented Aug. 17, 1909.
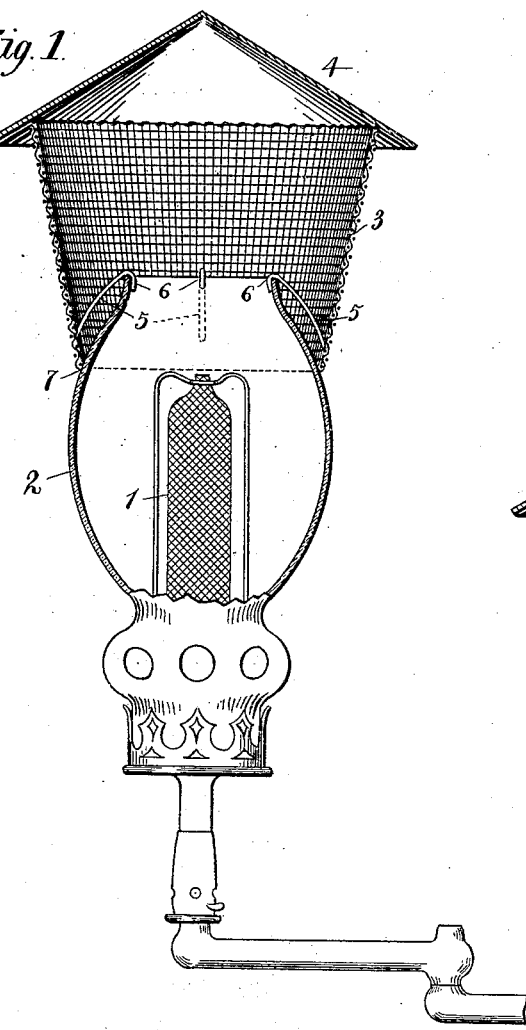
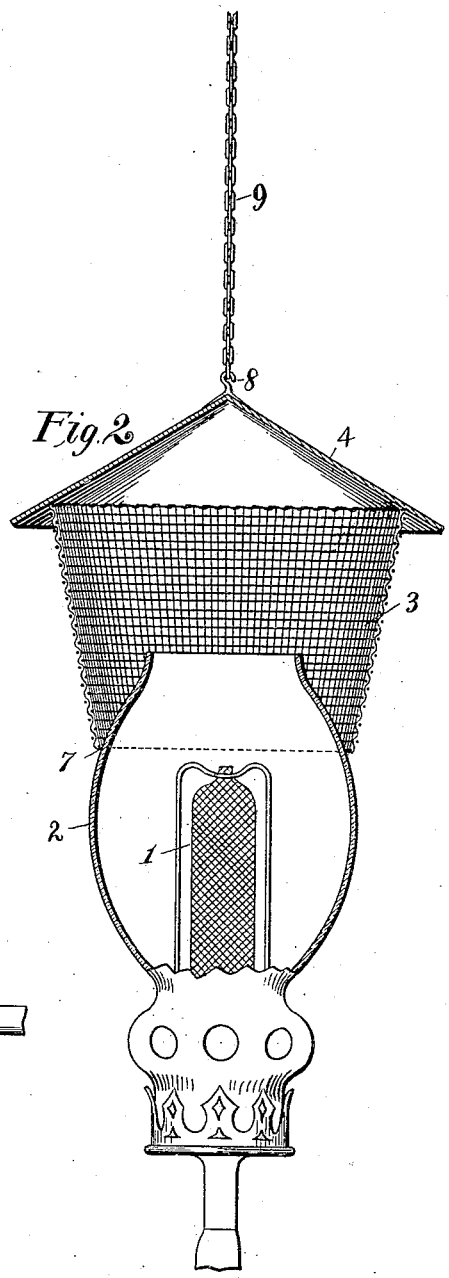
Witnesses
Chas. F. Bassett
M. A. Milord
Inventor
W. H. Geddes
By Frederick Benjamin
Attorney

UNITED STATES PATENT OFFICE.

WILLIAM H. GEDDES, OF MUSKINGUM, OHIO.

LIGHT-PROTECTOR.

No. 931,407. Specification of Letters Patent. Patented Aug. 17, 1909.

Application filed March 1, 1906. Serial No. 303,671.

*To all whom it may concern:*

Be it known that I, WILLIAM H. GEDDES, citizen of the United States, residing at Muskingum, in the county of Washington and State of Ohio, have invented certain new and useful Improvements in Light-Protectors, of which the following is a specification.

My invention relates to gas, oil and other fixtures and devices used for illuminating purposes, and its object is to provide means for preventing insects, dust and other foreign substances from coming in contact with the flame or the incandescent mantle where the latter is used.

At certain seasons of the year the entrance of insects into the light space of globes or lamp chimneys where they may come in contact with the flame is of common occurrence and exceedingly annoying, often resulting in fracture of the chimney or quenching of the flame. The damage thus done by insects is very extensive in the case of incandescent mantles. The fabric of which the mantle is composed is so friable as to be readily broken by the slightest touch so that the impact of even a small insect in flight may be sufficient to cause complete destruction of one of these articles. Another cause of injury to mantles is the accumulation of dust which soon detracts from their illuminating quality.

In the accompanying drawings which form a part of this application:—Figure 1 is a sectional view of a gas light supplied with an incandescent mantle and equipped with my improved protective device; Fig. 2 is a similar view, but showing a modified method of supporting the device.

Referring to the drawings, 1 is an ordinary incandescent mantle supported in the usual manner and surrounded by a globe 2 which is arranged on the fixture and produces the required draft for the flame in a manner similar to that of a chimney.

It is through the upper orifice or mouth of the chimney or globe that insects usually find their way to the flame or the light space. I therefore provide for the upper part of the chimney or globe a metallic screen 3, preferably formed of fine meshed wire cloth or netting, having a weave sufficiently open to give free passage to the hot air and products of combustion, but which will not allow the entrance of small insects. The lower edge of this screen 3 rests closely upon the outer surface of the globe 2 by means of its lower edge 7, but in order to prevent undue pressure upon said globe and to avoid breakage which might result from the unequal expansion of the vitreous globe and metal of the screen and to prevent the accidental displacement of the device I provide supports formed of curved wires 5, the lower ends of which are secured to the lower part of the screen in any suitable manner, the upper ends being bent in the form of hooks 6, which engage the upper edge of the globe or chimney 2.

An imperforate metal cover 4, conical in shape, is placed over the screen and rests thereon, having sufficient lateral extension to prevent the settling of dust within the confines of the screen. This cover may be removably attached to the screen, but I prefer to secure it thereto by soldering.

In the case of a fixed jet or lamp it may sometimes be desirable to provide means for suspending the screen and cover from some outside support. Such an arrangement is shown in Fig. 2, in which I provide a hook 8, of any suitable form and attached to the apex of the conical cover in any convenient manner, and support the entire structure by means of a chain 9 adapted to engage said hook and having sufficient tension to keep the lower margin 7 of the screen 3 lightly in apposition with the globe 2, the chain being suspended from any suitable means.

It is obvious that many changes may be made in the precise form of my invention without departing from the spirit and scope thereof, and I therefore do not wish to be limited to the exact structure herein described; but

Having thus described my invention, what I claim is:—

A device for the purpose specified, including a wire gauze screen in the form of an inverted truncated cone, and adapted to removably fit over and rest upon the sides of a lamp chimney or globe, an imperforate conical cover secured to the upper edge of the screen and having its edges overhanging the screen, and a plurality of supporting hooks attached to the lower portion of said screen and adapted to detachably engage the upper edge of said chimney or globe.

In testimony whereof I affix my signature in presence of two witnesses.

WILLIAM H. GEDDES.

Witnesses:
SIMON CLINE,
H. H. GURLEY.